UNITED STATES PATENT OFFICE.

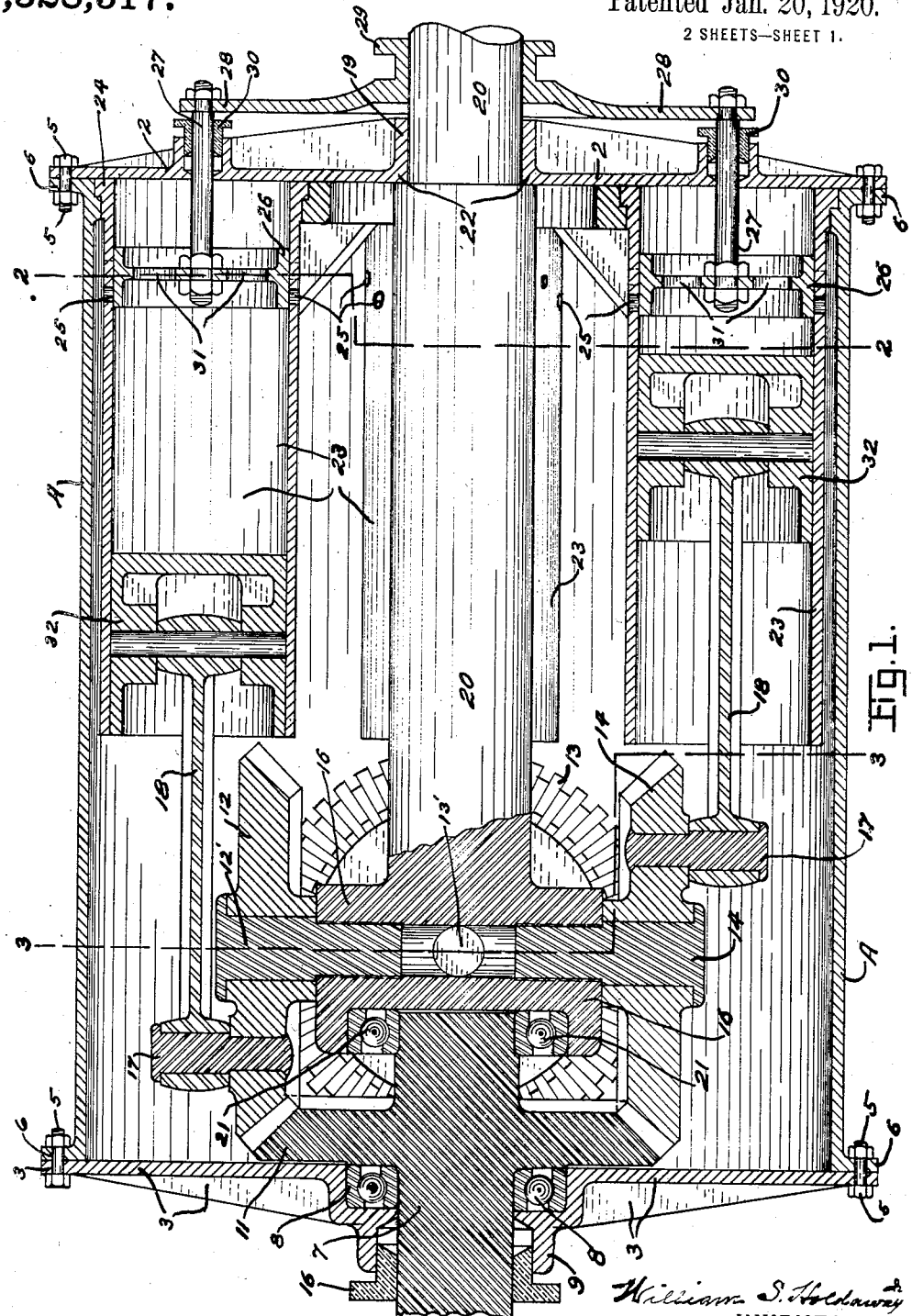

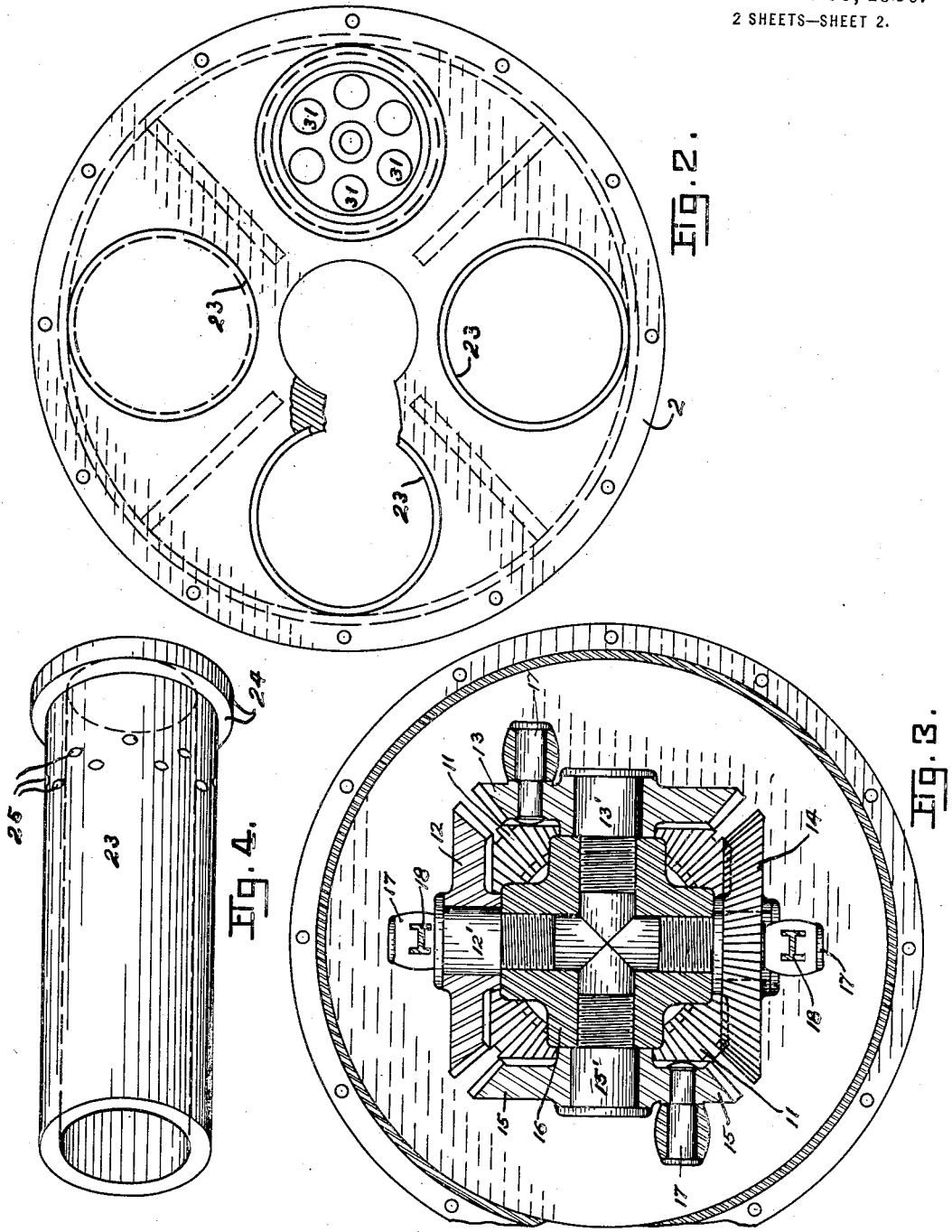

WILLIAM S. HOLDAWAY, JR., OF SALT LAKE CITY, UTAH.

POWER-TRANSMISSION MACHINE.

1,328,517.　　　　　Specification of Letters Patent.　　Patented Jan. 20, 1920.

Application filed January 20, 1919. Serial No. 272,213.

*To all whom it may concern:*

Be it known that I, WILLIAM S. HOLDAWAY, Jr., a citizen of the United States, residing at Salt Lake City, in the county of Salt Lake and State of Utah, have invented certain new and useful Improvements in Power-Transmission Machines, of which the following is a specification.

My invention relates to power transmission, and has for its object to provide a mechanism by which the power of a driving shaft may be transmitted to an alined driven shaft with a gradual change of speed from neutral to high speed without the use of friction disks or speed changing gears.

These objects I accomplish with the machine illustrated in the accompanying drawings in which similar letters and numerals of reference indicate like parts throughout the several figures and as described in the specification forming a part of this application and pointed out in the appended claims.

In the drawings in which I have shown a substantial embodiment of my invention, Figure 1 is a longitudinal section of the machine, parts shown in elevation. Fig. 2 is a transverse section on lines 2—2 of Fig. 1. Fig. 3 is a transverse section on line 3—3 of Fig. 1. Fig. 4 is a view in perspective of one of the piston cylinders.

The present invention consists of the oil filled cylinder A with the end plates 2 and 3 held as closures for said cylinder by the bolts and nuts 5, which are passed through said end plates and outwardly extended flanges 6 on said cylinder. The driving shaft 7 is journaled on the ball bearings 8 which are carried in a flange 9 on said end plate 3. A stuffing box 10 is screwed into said flange 9 to prevent the escape of oil from the interior of said cylinder A. A bevel gear 11 is integrally formed or secured on said shaft 7, the teeth of which mesh with four bevel gears 12, 13, 14 and 15 which are in turn journaled on the stub shafts 12', 13', 14' and 15' one end of each of which is secured in the hub member 16 of the driven shaft 20. One portion of said hub member 16 is bored to form the bearing recess within which other ball bearings 21 for said driving shaft 7 are carried. In each of said bevel gears 12, 13, 14 and 15 is secured a wrist pin 17, and on each is secured one end of the connecting rods 18. The end plate 2 has a central flanged portion shown at 19 in which the driven shaft 20 is secured and a shoulder on said shaft shown at 22 contacts with said end plate 2. The piston cylinders 23 are secured in said cylinder A by means of a flange on said piston cylinders shown at 24. The said cylinders have radial ports 25 bored in their walls. A valve 26 is operated in each of said cylinders 23 and as said valves are moved back and forth over said ports 25 the flow of oil to the interior of said cylinder A is regulated. The stem 27 of each of said valves 26 is secured in the flange 28 of a collar 29 which collar is carried on said driven shaft 20. Stuffing boxes 30 are provided where said valve stems 27 pass through said end plate 2 to prevent the leakage of oil. The interior or flat portion of each of said valves 26 is perforated or bored to provide ports 31 through which the oil may pass freely from one side of said valves 26 to the other. Within the said chambers 23 are operated the pistons 32 and said pistons are operatively connected with the said connecting rods 18.

The operation of my machine is as follows:—

With oil filling the interior of said cylinders A and 23, when the driving shaft 7 is rotated the bevel gear 11 will rotate therewith and if the bevel gears 12, 13, 14 and 15 can not rotate, the power on said shaft 7 will carry the said cylinders A and 23 around with it, and power will be transmitted to said shaft 20. If the said bevel gears 12, 13, 14 and 15 are rotated on their axes the pistons 32 will be reciprocated within the cylinders 23. When the flanged collar 29 is moved on the shaft 20 to partially close said ports 25 the action of said pistons will be retarded and the said bevel gears 12, 13, 14 and 15 will be carried around and rotate said shaft 20 in proportion to the amount of retardation of the said pistons. I am thus able to control the speed of said shaft 20 by the movement of said valves 26 to open or partially close said ports 25.

Having thus described my invention and its operation I desire to secure by Letters Patent and claim:—

1. A power transmitting mechanism comprising alined shafts; a fluid casing receiving said shafts from opposite ends and secured on and rotatable with one of said shafts; a plurality of piston cylinders fixed to and spaced annularly in said casing having ports cut in their side walls; a piston operable in each of said cylinders; a bevel pinion secured on and rotatable with one of said shafts; bevel gears journaled on the other of said shafts the teeth of which gears mesh with the teeth of said bevel pinion; wrist pins in said bevel gears; rods connecting said wrist and said pistons; a valve in each of said piston cylinders to open and close said ports; a collar carried on one of said shafts; and a stem connecting each one of said valves with said collar.

2. A power transmitting mechanism comprising two alined crank shafts one of which carries a hub member and ball bearings in which the end of the other shaft is journaled; a fluid casing receiving said shafts from opposite ends and secured on and rotatable with one of said shafts; a plurality of piston cylinders fixed to and spaced annularly in said casing having ports cut in their side walls; a piston operable in each of said cylinders; a bevel pinion secured on and rotatable with one of said shafts; bevel gears journaled on the other of said shafts the teeth of which gears mesh with the teeth of said bevel pinion; wrist pins in said bevel gears; rods connecting said wrist pins and said pistons; a valve in each of said piston cylinders to open and close said ports; a collar carried on one of said shafts; and a stem connecting each of said valves with said collar.

3. A power transmitting mechanism comprising two alined crank shafts one of which carries a hub member and ball bearings in which the end of the other shaft is journaled; a fluid casing receiving said shafts from opposite ends and secured on and rotatable with one of said shafts; a plurality of piston cylinders fixed to and spaced annularly in said casing having ports cut in their side walls; a piston operable in each of said cylinders; a bevel pinion secured on and rotatable with one of said shafts; stub shafts secured radially in said hub member; bevel gears journaled on said stub shafts the teeth of which gears mesh with the teeth of said bevel pinion; wrist pins in said bevel gears; rods connecting said wrist pins and said pistons; a valve in each of said piston cylinders to open and close said ports; a collar carried on one of said shafts; and a stem connecting each of said valves with said collar.

4. A power transmitting mechanism comprising alined drive and driven shafts, bevel gearing rotatable with one of said shafts, bevel gearing rotatable with the other of said shafts and meshing with said first-named gearing, a casing inclosing said gearing and rotatable with one of said shafts, and means carried by said casing and connected to said first-named bevel gearing for altering the driving relation between said shafts.

5. A power transmitting mechanism comprising a drive and a driven shaft, a gear rotatable with said drive shaft, a gear rotatable with said driven shaft and meshing with said first-named gear, a casing inclosing said gearing and rotatable with one of said shafts, and means carried by said casing for controlling the relative rotation of said gears.

6. A power transmitting mechanism comprising alined drive and driven shafts, one of said shafts formed with a yoke, a plurality of shafts radially journaled in said yoke and provided with bevel gears, a bevel gear on the other shaft meshing with said bevel gears, a casing rotatable with one of said shafts, and means carried by said casing and connected with said bevel gears journaled in said yoke for controlling the relative rotation between said intermeshing gears.

7. A power transmitting mechanism comprising alined drive and driven shafts, the inner end of said driven shaft being formed with an integral radially bored yoke and forming a bearing adapted to rotatably receive the end of said drive shaft, a bevel gear fixed to said drive shaft, and a plurality of shafts journaled in the bores in said yoke and provided with bevel gears meshing with the bevel gear on said drive shaft, and means rotating with said driven shaft adapted to control the relative rotation between said intermeshing gears.

In testimony whereof I have affixed my signature.

WILLIAM S. HOLDAWAY, Jr.